US011430610B2

(12) United States Patent
Jogan et al.

(10) Patent No.: US 11,430,610 B2
(45) Date of Patent: Aug. 30, 2022

(54) FILM CAPACITOR

(71) Applicants: Murata Manufacturing Co., Ltd., Nagaokakyo (JP); Shizuki Electric Co., Inc., Nishinomiya (JP)

(72) Inventors: Satoru Jogan, Nagaokakyo (JP); Tomomichi Ichikawa, Nagaokakyo (JP); Shinichi Kobayashi, Nagaokakyo (JP); Tomoki Inakura, Nagaokakyo (JP); Kimiaki Kikuchi, Nishinomiya (JP); Satoshi Kamei, Nishinomiya (JP); Kyosuke Yoshida, Nishinomiya (JP)

(73) Assignees: MURATA MANUFACTURING CO., LTD., Nagaokakyo (JP); SHIZUKI ELECTRIC CO., INC., Nishinomiya (JP)

( * ) Notice: Subject to any disclaimer, the term of this patent is extended or adjusted under 35 U.S.C. 154(b) by 0 days.

(21) Appl. No.: 15/930,740

(22) Filed: May 13, 2020

(65) Prior Publication Data

US 2020/0273624 A1  Aug. 27, 2020

Related U.S. Application Data

(63) Continuation of application No. PCT/JP2018/023423, filed on Jun. 20, 2018.

(30) Foreign Application Priority Data

Nov. 15, 2017  (JP) .............................. JP2017-220206

(51) Int. Cl.
  *H01G 4/33*  (2006.01)
  *H01G 4/008*  (2006.01)

(52) U.S. Cl.
  CPC ............... *H01G 4/33* (2013.01); *H01G 4/008* (2013.01)

(58) Field of Classification Search
  CPC ............ H01G 4/008; H01G 4/18; H01G 4/20; H01G 4/232; H01G 4/2325; H01G 4/32; H01G 4/33
  See application file for complete search history.

(56) References Cited

U.S. PATENT DOCUMENTS 3,935,334 A * 1/1976 Narui .................... C23C 14/042
                                                            427/81
10,650,965 B2  5/2020 Kikuchi
(Continued)

FOREIGN PATENT DOCUMENTS

JP  H1022169 A  1/1998
JP  2012156156 A  8/2012
(Continued)

OTHER PUBLICATIONS

Japanese Office Action issued for Japanese Application No. 2019-553691, dated Apr. 13, 2021.
(Continued)

*Primary Examiner* — Nathan Milakovich
(74) *Attorney, Agent, or Firm* — ArentFox Schiff LLP

(57) ABSTRACT

A film capacitor that includes a laminate having a first resin film including a first metal layer on a surface thereof alternately laminated with a second resin film including a second metal layer on a surface thereof, the laminate having opposed first and second ends, a first external electrode on the first end of the laminate, and a second external electrode on the second end of the laminate, wherein the first resin film protrudes more than the second resin film by a first protruding length of 0.5 mm to 3 mm on the first end of the laminate, and the first resin film has a Young's modulus at 150° C. of 0.6 GPa or more in a direction perpendicular to a lamination direction of the laminate and parallel to a direction from the first end to the second end of the laminate.

20 Claims, 3 Drawing Sheets

Cross-sectional view taken along line A–A

(56) References Cited

U.S. PATENT DOCUMENTS

| 10,679,793 | B2 | 6/2020 | Suzuki | |
|---|---|---|---|---|
| 2018/0233291 | A1 | 8/2018 | Suzuki | |
| 2019/0115152 | A1 | 4/2019 | Kikuchi | |
| 2020/0203078 | A1* | 6/2020 | Sano | H01G 4/008 |
| 2020/0211772 | A1* | 7/2020 | Ichikawa | H01G 4/32 |
| 2021/0217558 | A1* | 7/2021 | Nakao | H01G 4/005 |

FOREIGN PATENT DOCUMENTS

| WO | 2013069485 A1 | 5/2013 |
|---|---|---|
| WO | 2017134699 A1 | 8/2017 |
| WO | 2017188327 A1 | 11/2017 |

OTHER PUBLICATIONS

International Search Report issued for PCT/JP2018/023423, dated Aug. 7, 2018.
Written Opinion of the International Searching Authority issued for PCT/JP2018/023423, dated Aug. 7, 2018.

\* cited by examiner

Cross-sectional view taken along line A-A

FIG.4A – PRIOR ART
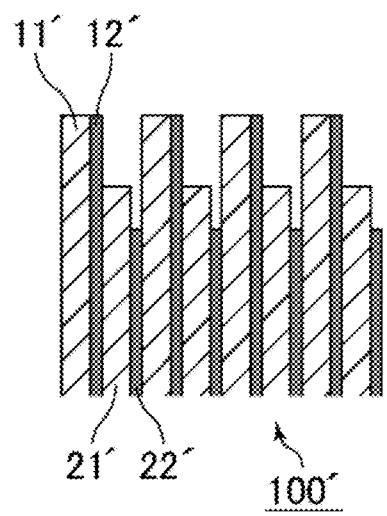
FIG.4B – PRIOR ART
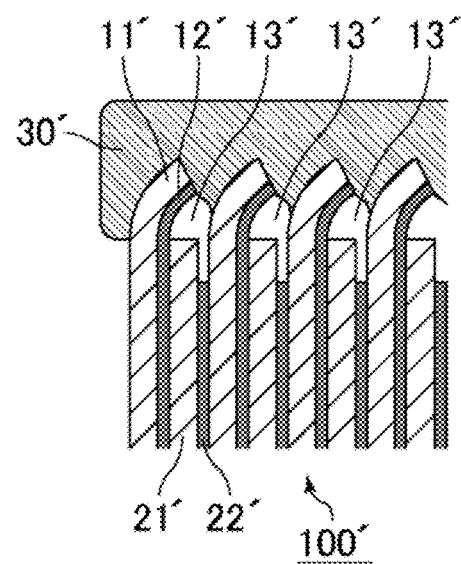

FILM CAPACITOR

CROSS REFERENCE TO RELATED APPLICATIONS

The present application is a continuation of International application No. PCT/JP2018/023423, filed Jun. 20, 2018, which claims priority to Japanese Patent Application No. 2017-220206, filed Nov. 15, 2017, the entire contents of each of which are incorporated herein by reference.

FIELD OF THE INVENTION

The present invention relates to a film capacitor.

BACKGROUND OF THE INVENTION

One type of capacitor is a film capacitor including a flexible resin film as a dielectric, a first counter electrode, and a second counter electrode opposing the first counter electrode across the resin film. Such a film capacitor is produced by laminating a resin film having a first counter electrode and a resin film having a second counter electrode to obtain a laminate, with their ends displaced from each other in a width direction perpendicular to a winding direction, winding the laminate to obtain a wound body, and forming external electrodes on both ends of the wound body by a method such as metal spraying. The first counter electrode and the second counter electrode are each sometimes simply referred to as a "metal layer."

Dielectric materials of film capacitors are required to have heat resistance and mechanical strength. A conventional film capacitor including polypropylene as a dielectric material (resin film) has a heat resistance of about 105° C., which is insufficient. In this regard, for example, Patent Literature 1 (WO 2013/69485) discloses a film capacitor including a main surface having a surface roughness Ra of 3 nm to 1000 nm, and containing a resin having a glass transition temperature of 130° C. or higher, wherein the amount of a pyrolysis residue of the resin at 500° C. is 40 wt % or less when the thermogravimetric change of the resin is measured at a heating rate of 10° C./min in nitrogen.

SUMMARY OF THE INVENTION

Recent demands for smaller film capacitors have created a demand for thinner resin films.

Yet, film capacitors including thin resin films sometimes fail to exhibit sufficient temperature cycle characteristics in a high temperature environment (e.g., 125° C.) even when the resin film has sufficient heat resistance, as in the case of the film capacitor disclosed in Patent Literature 1.

As a result of extensive studies on the above problem, the present inventors found that the characteristics of resin films during formation of an external electrode by thermal spraying have a significant impact on the temperature cycle characteristics.

Specifically, resin films are more easily deformed as they are made thinner even when they have sufficient heat resistance, and such resin films are thus deformed by heat and/or air pressure during formation of an external electrode by thermal spraying. As a result, gaps into which a thermal spray material cannot penetrate are formed in the external electrode. This results in a reduced contact area between the external electrode and a counter electrode, which causes the internal resistance to easily increase. In other words, this presumably results in reduced stability of temperature cycle characteristics.

This is explained with an example shown in FIGS. 4A and 4B. When an external electrode is to be formed by thermal spraying at an end of a laminate 100' including resin films 11' each having a metal layer 12' on a surface and resin films 21' each having a metal layer 22' on a surface as shown in FIG. 4A, presumably, portions of the space into which a thermal spray material 30' is supposed to penetrate are blocked by the deformed resin films 11' and form gaps 13' not filled with the thermal spray material 30' as shown in FIG. 4B. This results in reduced contact between the thermal spray material 30' and the metal layers 12'.

Specifically, the conventional film capacitor disclosed in Patent Literature 1 which is produced using resin and polypropylene has poor temperature cycle characteristics in a high temperature environment (e.g., 125° C.) when the resin films are thin.

The present invention was made to solve the above problem, and aims to provide a film capacitor having excellent temperature cycle characteristics in a high temperature environment and capable of preventing or reducing an increase in internal resistance even when resin films are thin.

The film capacitor of the present invention includes a laminate having a first resin film including a first metal layer on a surface thereof alternately laminated with a second resin film including a second metal layer on a surface thereof, the laminate having opposed first and second ends, a first external electrode on the first end of the laminate, and a second external electrode on the second end of the laminate, wherein the first resin film protrudes more than the second resin film by a first protruding length of 0.5 mm to 3 mm on the first of the laminate, and the first resin film has a Young's modulus at 150° C. of 0.6 GPa or more in a direction perpendicular to a lamination direction of the laminate and parallel to a direction from the first end to the second end of the laminate.

Preferably, the first resin film satisfies: Y≤0.5t+0.5, where Y is the protruding length and t is the thickness of the first resin film.

In the film capacitor of the present invention, preferably, the first resin film has a thickness of 1 µm or more.

In the film capacitor of the present invention, preferably, the first resin film has a thickness of 3 µm or less.

In the film capacitor of the present invention, preferably, the Young's modulus of the first resin film is 0.6 GPa to 1.1 GPa.

In the film capacitor of the present invention, preferably, the first resin film contains, as a main component thereof, a resin having at least one of a urethane bond or a urea bond.

In the film capacitor of the present invention, preferably, the main component is a curable resin.

In the film capacitor of the present invention, preferably, the first and second external electrodes are made of a metal material that includes zinc.

In the film capacitor of the present invention, preferably, the first metal layer is thinner than the first resin film.

In the film capacitor of the present invention, preferably, the first metal layer contains aluminum or zinc.

In the film capacitor of the present invention, preferably, the first resin film contains at least one of an isocyanate group or a hydroxyl group.

In the film capacitor of the present invention, preferably, when the film capacitor is subjected to a temperature cycle test in which a temperature cycle of a lowest temperature of −40° C. with a retention time of 30 minutes and a highest temperature of 150° C. with a retention time of 30 minutes is repeated 1000 times in an air tank, an ESR value after the temperature cycle test is not more than 1.5 times an ESR value before the temperature cycle test. The ESR means equivalent series resistance.

The present invention provides a film capacitor having excellent temperature cycle characteristics in a high temperature environment and capable of preventing or reducing an increase in internal resistance even when resin films are thin.

BRIEF DESCRIPTION OF THE DRAWINGS

FIG. 4A and FIG. 4B are schematic views of an example of a method of forming an external electrode used in a conventional technique.

DETAILED DESCRIPTION OF THE PREFERRED EMBODIMENTS

A film capacitor of the present invention and a method of producing the film capacitor of the present invention are described below.

The present invention is not limited to the following preferred embodiments, and may be suitably modified without departing from the gist of the present invention. Combinations of two or more preferred features described in the following preferred embodiments are also within the scope of the present invention.

Film Capacitor

The film capacitor of the present invention is described first.

The film capacitor of the present invention includes a laminate of a first resin film including a first metal layer on a surface thereof and a second resin film including a second metal layer on a surface thereof, and external electrodes on opposed first and second ends of the laminate. The first resin film and the second resin film are alternately laminated, the first resin film protrudes more than the second resin film by a protruding length of 0.5 mm to 3 mm on a first end where one of the external electrodes is formed, and the first resin film has a Young's modulus at 150° C. of 0.6 GPa or more in a direction perpendicular to a lamination direction of the laminate and parallel to a direction from the first end to the second end of the laminate where the external electrodes are formed.

The direction "parallel to a direction from the first end to the second end of the laminate where the external electrodes are formed" may also be defined as a direction parallel to a direction that interconnects the ends of the laminate including the external electrodes.

The structure of the film capacitor of the present invention is described with reference to FIG. 1A and FIG. 1B.

Figure 1A:
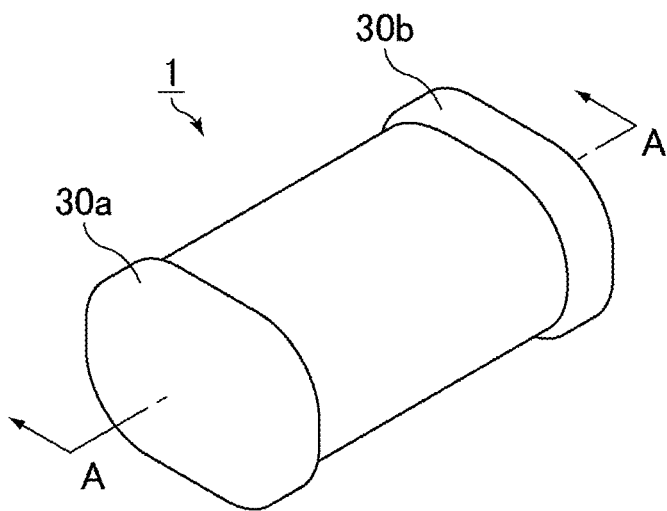
FIG. 1A is a schematic perspective view of an example of a film capacitor of the present invention.

FIG. 1A is a schematic perspective view of an example of the film capacitor of the present invention. FIG. 1B is a cross-sectional view taken along the line A-A in FIG. 1A.

Figure 1B:
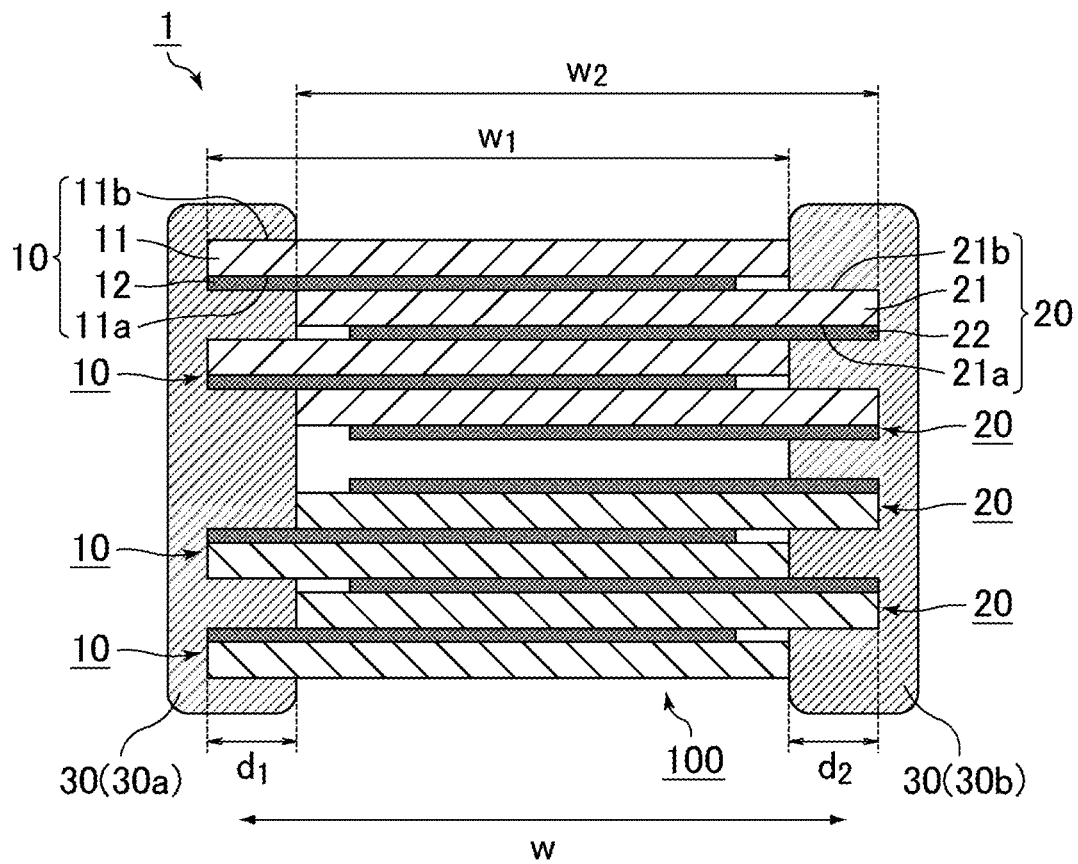
FIG. 1B is a cross-sectional view taken along the line A-A in FIG. 1A.

As shown in FIG. 1A and FIG. 1B, a film capacitor 1 includes a laminate 100 of first resin films 11 each including a first metal layer 12 on a surface thereof (a pair of one resin film 11 and one first metal layer 12 is also referred to herein as a first metalized film 10) and second resin films 21 each including a second metal layer 22 on a surface thereof (a pair of one second resin film 21 and one second metal layer 22 is also referred to herein as a second metalized film 20), and external electrodes 30 (30a and 30b) on opposed first and second ends of the laminate 100.

As shown in FIG. 1B, the first metalized films 10 and the second metalized films 20 are arranged in the laminate 100 such that the first metal layers 12 and the second metal layers 22 are alternately laminated, and the external electrodes 30 (30a and 30b) are connected to the opposed first and second ends of the laminate 100.

Specifically, the first metalized films 10 each including the first metal layer 12 on a first surface 11a of the first resin film 11, and the second metalized films 20 each including the second metal layer 22 on a first surface 21a of the second resin film 21 are laminated such that the first metal layers 12 are in contact with second surfaces 21b of the second resin films 21. Similar to the first metalized films 10, the second metalized films 20 are laminated such that the second metal layers 22 are in contact with second surfaces 11b of the first resin films 11. Thus, the first metal layers 12 and the second metal layers 22 are laminated opposing each other with the first resin film 11 or the second resin film 21 therebetween, providing a laminate in which the first metal layers 12 and the second metal layers 22 are alternately laminated.

In each first metalized film 10, the first surface 11a of the first resin film 11 is continuously covered with the first metal layer 12 from a first end (where the external electrodes 30a is formed in FIG. 1B) to a position spaced from a second end (where the external electrode 30b is formed in FIG. 1B) by a predetermined distance.

In each second metalized film 20, the second resin film 21 is continuously covered with the second metal layer 22 in a width direction from the second end and to a position spaced from the first end by a predetermined distance.

Further, the first metalized films 10 are laminated while their ends are displaced from the second metalized films 20 at the first end of the laminate 100. Thus, at the first end (where the external electrode 30a is formed) of the laminate 100, the first resin films 11 protrude more than the second resin films 21, and the protruding length (indicated by an arrow $d_1$ in FIG. 1B) is 0.5 mm to 3 mm. The first metal layers 12 extend from the first end toward the second end, and thus protrude more than the second resin films 21 at the first end. At the second end, the second metal layers 22 protrude more than the first resin films 11.

In this state, the external electrodes 30 are provided at both of the opposed first and second ends of the laminate 100. Thus, at the first end, the external electrode 30a enters between the protruding first metalized films 10 and extends to a first end of each second metalized film 20. Thus, the external electrode 30a is in sufficient contact with the first metal layers 12 in a region where the first resin films 11 protrude more than the second resin films 21. Consequently, the external electrode 30a is electrically connected to the first metal layers 12. In contrast, each second metal layer 22 is not formed from a first end of the second resin film 21 to a position spaced from the first end by a predetermined distance. Consequently, the external electrode 30a is not electrically connected to the second metal layers 22.

The external electrode 30b is in sufficient contact with the second metal layers in a region where the second resin films 21 protrude more than the first resin films 11. Consequently, the external electrode 30b is electrically connected to the second metal layers 22. In contrast, each first metal layer 12 is not formed from a second end of the first resin film 11 to a position spaced from the second end by a predetermined distance. Consequently, the external electrode 30b is not electrically connected to the first metal layers 12.

Thus, while the first metal layers 12 exposed at a first end surface are electrically connected to the external electrode 30a, and the second metal layers 22 exposed at a second end surface are electrically connected to the external electrode 30b, the first metal layers 12 and the second metal layers 22 are not electrically connected to each other and are insulated from each other.

Further, the first resin films 11 have a Young's modulus at 150° C. of 0.6 GPa or more in a direction (indicated by a double-headed arrow w in FIG. 1B) perpendicular to the lamination direction of the laminate 100 and parallel to a direction from the first end to the second end of the laminate 100 where the external electrodes 30 are formed.

The direction to determine the Young's modulus of the first resin films 11 is a direction from a portion where the first resin films 11 protrude to a portion where the second resin films 21 protrude, or a direction perpendicular to a thickness direction of the first resin films 11. In other words, it is a direction parallel to a direction from the central portion of each first resin film 11 toward one of the ends of the laminate 100 to which the external electrodes 30 are connected.

The first metal layers 12 and the second metal layers 22 may be arranged in any manner as long as electrical connection (in other words, short circuit) via the first metal layers 12 and/or the second metal layers 22 does not occur between the external electrode 30a on the first end and the external electrode 30b on the second end. Yet, preferably, the first metal layers 12 and the second metal layers 22 are alternately laminated such that a contact is prevented between the first metal layers 12 and the second metal layers 22.

In each first metalized film defining the film capacitor of the present invention, the first metal layer may be formed entirely on a surface (first surface) of the first resin film. Alternatively, the surface (first surface) of the first resin film may have a region without the first metal layer.

In FIG. 1B, the first metal layers 12 are not formed at the end where the first metalized films 10 do not protrude more than the second metalized films 20 (at the end where the external electrode 30b is formed).

The same as in the first metalized films 10 applies to the second metalized films 20. Yet, preferably, regions without the second metal layers 22 are provided in the opposite direction. In FIG. 1B, there are regions where the second metal layers 22 are not formed at the end where the second metalized films 20 do not protrude more than the first metalized films 10 (where the external electrode 30a is formed).

The first resin film defining the film capacitor of the present invention has a Young's modulus at 150° C. of 0.6 GPa or more, preferably, 0.6 GPa to 1.1 GPa, in a direction (hereinafter, also referred to as a width direction) perpendicular to the lamination direction of the laminate and parallel to a direction from the first end to the second end of the laminate where the external electrodes are formed.

A first resin film having a Young's modulus of less than 0.6 GPa is deformed during formation of the external electrodes by thermal spraying, leading to insufficient contact between the first metal layer on the surface of the first resin film and the external electrode. This results in poor temperature cycle characteristics.

A first resin film having a Young's modulus of more than 1.1 GPa makes it very difficult to flatten the laminate after winding.

The Young's modulus can be measured by a dynamic viscoelasticity measurement method (DMA method) using RSA III available from TA Instruments. Even when the first resin film includes the first metal layer on the surface, it does not affect the measurement of the Young's modulus, so that the Young's modulus of the first resin film can be measured on the first metalized film.

In the film capacitor of the present invention, the first resin film protrudes more than the second resin film on the first end where one of the external electrodes is formed, and the protruding length is 0.5 mm to 3 mm.

When the protruding length is less than 0.5 mm, the bonding area between the first metal layer and the external electrode is reduced, resulting in poor temperature cycle characteristics. When the protruding length is more than 3 mm, the first resin film is easily deformed, and a gap is formed, resulting in insufficient bonding between the first metal layer and the external electrode.

The resin films defining the film capacitor are usually prepared in the form of long strips. Thus, the width direction of the wound film capacitor corresponds to the width direction of the resin films during production.

In the film capacitor of the present invention, preferably, the first resin film contains, as a main component, a resin having at least one of a urethane bond or a urea bond. Examples of such a resin include a urethane resin having a urethane bond and urea resin having a urea bond. Examples may also include a resin having both urethane bond and urea bond. Specific examples thereof include curable resins and vapor deposition polymerized films which are described later.

The presence of a urethane bond and/or a urea bond can be confirmed using a Fourier transform infrared (FT-IR) spectrophotometer.

The term "main component" as used herein refers to a component with the higher proportion (wt %), and preferably refers to a component whose proportion is more than 50 wt %. Thus, the first resin film may contain other components in addition to the main component. Examples of the other components include additives such as silicone resin and uncured residues of starting materials such as a first organic material and a second organic material which are described later.

In the film capacitor of the present invention, the first resin film may contain a curable resin as a main component. The curable resin may be a thermosetting resin or a photocurable resin. The curable resin may or may not have at least one of a urethane bond or a urea bond.

Preferably, the first resin film defining the film capacitor of the present invention contains, as a main component, a resin having a glass-transition temperature of 150° C. or higher. Examples thereof include curable resins such as thermosetting resins and photocurable resins, thermoplastic resins, and vapor deposition polymerized films. Preferred among there are curable resins.

Examples of curable resins having a glass-transition temperature of 150° C. or higher include phenolic resins, epoxy resins, melamine resins, urea resins, unsaturated polyester resins, silicone resins, polyurethanes, and thermosetting polyimides. Any combination of two or more of these may be used.

The term "thermosetting resin" as used herein refers to a heat-curable resin, and the curing method is not limited. Thus, the thermosetting resin encompasses a resin cured by a method other than heat (such as light or electron beam) as long as the resin is heat curable. Some materials may start a reaction due to their own reactivity. The thermosetting resin also includes such materials that do not necessarily require external heat, light, or the like to start curing. The same applies to the photocurable resins, and the curing method is not limited.

The term "vapor deposition polymerized film" refers to a film formed by vapor deposition polymerization. In principle, the curable resin includes such a film.

Examples of thermoplastic resins having a glass-transition temperature of 150° C. or higher include polycarbonates, polyamides, polyetheretherketones, polyarylates, aramids, polyether sulfone resins, and fluororesins. Any combination of two or more of these may be used.

The curable resin may be a cured reaction product of the "first organic material" and the "second organic material". Examples thereof include a cured product obtained by a reaction between a hydroxyl group (OH group) of the first organic material and an isocyanate group (NCO group) of the second organic material.

Examples of the first organic material include polyvinyl acetal resins such as polyvinyl acetoacetal resin; polyols such as polyether polyols (e.g., phenoxy resins) and polyester polyols; cellulose (including derivatives) such as cellulose and acetyl cellulose; and polymer epoxy resins. Of these, a polyol having two or more hydroxyl groups (OH groups) in the molecule is preferred. Examples of the polyol include polyether polyols, polyester polyols, and polyvinyl acetoacetal.

The first organic material may be any combination of two or more organic materials.

The second organic material is preferably an isocyanate compound, an epoxy resin, or a melamine resin having two or more functional groups in the molecule. The second organic material may be any combination of two or more organic materials.

Examples of the isocyanate compound include aromatic polyisocyanates such as diphenylmethane diisocyanate (MDI), naphthalene diisocyanate (NDI), and tolylene diisocyanate (TDI); and aliphatic polyisocyanates such as hexamethylene diisocyanate (HDI). Examples may also include modified products of these polyisocyanates, such as a modified product containing carbodiimide or urethane. Of these, aromatic polyisocyanates are preferred, and MDI is more preferred.

Any epoxy resin may be used as long as it is a resin having an epoxy ring. Examples thereof include bisphenol A epoxy resins, epoxy resins having a biphenyl skeleton, epoxy resins having a cyclopentadiene skeleton, and epoxy resins with a naphthalene skeleton.

Any melamine resin may be used as long as it is an organic nitrogen compound having a triazine ring at the center of the structure and three amino groups around the triazine ring. Examples thereof include alkylated melamine resin. Examples may also include modified products of melamine.

The thickness of the first resin film defining the film capacitor of the present invention is not limited, but it is preferably 1 μm to 5 μm, more preferably 1 μm to 3 μm.

A first resin film having a thickness of less than 1 μm may be easily deformed. A first resin film having a thickness of more than 5 μm results in a smaller number of resin films that can be laminated per unit volume, so that it may be impossible to increase the capacitance per volume.

The thickness of the first resin film refers to the thickness of the film alone without including the thickness of the first metal layer. The thickness of the first resin film can be measured by an optical film thickness gauge.

Preferably, the first resin film defining the film capacitor of the present invention contains at least one of an isocyanate group or a hydroxyl group.

When the first resin film contains the functional group, the Young's modulus can be easily increased and characteristics required for the film capacitor can be easily obtained.

The first metal layer defining the film capacitor of the present invention may be made of, for example, aluminum, zinc, or an alloy mainly containing one or more of these metals.

When a material of the first metal layer contains aluminum or zinc, good bondability can be easily maintained between the first metal layer and the external electrode.

The thickness of the first metal layer defining the film capacitor of the present invention is not limited, but it is preferably smaller than the thickness of the first resin film, more preferably 1 nm to 100 nm.

A first metal layer having a thickness of less than 1 nm may have too high electrical resistance. A first metal layer having a thickness of more than 100 nm may result in excessive heating of the resin film during formation of such a thick metal layer by vapor deposition. This may cause thermal deterioration of the first resin film, failing to achieve desired Young's modulus and other desired characteristics.

The first metal layer may be formed entirely or only partially on the surface of the first resin film.

Alternatively, the first metal layer may be formed in two separate regions which are not in direct contact with each other on the first resin film.

When the film capacitor of the present invention includes two or more first resin films, these first resin films may be made of the same material or different materials.

In addition, these first resin films may have the same thickness or different thicknesses.

The second resin film defining the film capacitor of the present invention may be suitably made of the same material of the first resin film.

The material of the first resin film may be the same as or different from that of the second resin film.

The second metal layer defining the film capacitor of the present invention may be suitably made of the same material of the first metal layer. Preferably, the thickness of the second metal layer is the same as that of the first metal layer.

The material of the first metal layer may be the same as or different from that of the second metal layer.

In the film capacitor of the present invention, the first resin film protrudes more than the second resin film at the first end where one of the external electrodes is formed. Yet, the arrangement of the first resin film and the second resin film is not limited at the second end.

In other words, at the second end, the first resin film may protrude more than the second resin film, or the second resin film may protrude more than the first resin film.

Preferably, the protruding length of each resin film at the second end is 0.5 mm to 3 mm.

When the second resin film protrudes more than the first resin film at the second end, preferably, the second resin film also has a Young's modulus at 150° C. of 0.6 GPa or more in the width direction.

The arrangement of the first resin film and the second resin film at the second end is described with reference to FIG. 1B and FIG. 2.

Figure 2:
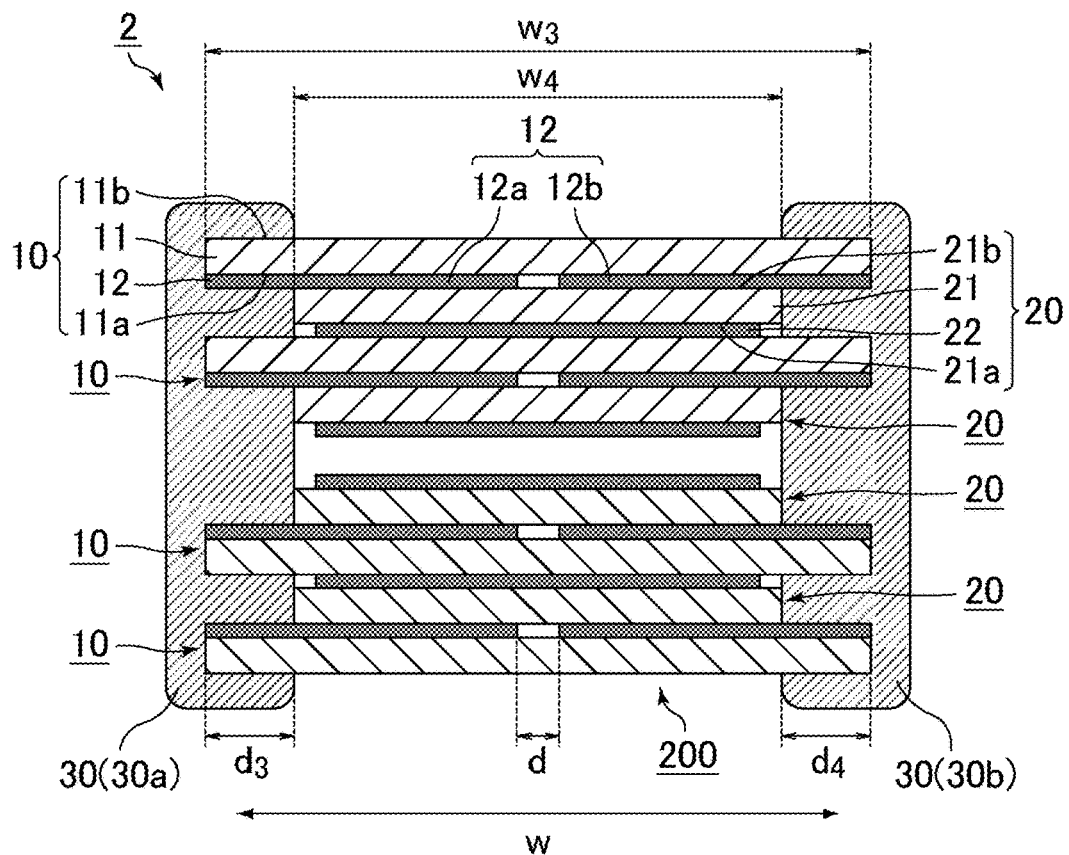
FIG. 2 is a schematic cross-sectional view of another example of the film capacitor of the present invention.

FIG. 2 is a schematic cross-sectional view of another example of the film capacitor of the present invention.

In FIG. 1B, the second resin films 21 protrude more than the first resin films 11 at the end where the external electrode 30b is formed.

In the film capacitor 1 shown in FIG. 1B, a length $w_1$ of the first resin films 11 in a width direction is substantially equal to a length $w_2$ of the second resin films 21 in a width direction. Thus, when the first resin films 11 protrude more than the second resin films 21 by a length $d_1$ at the first end (where the external electrode 30a is formed), the second resin films 21 protrude more than the first resin films 11 by a length $d_2$ at the second end (where the external electrode 30b is formed), and $d_1$ is equal to $d_2$.

A film capacitor 2 shown in FIG. 2 includes a laminate 200 of the first metalized films 10 each including the first resin film 11 having the first metal layer 12 on the first surface 11a and the second metalized films 20 each including the second resin film 21 having the second metal layer 22 on the first surface 21a, and the first and second external electrodes 30 (30a and 30b) on opposed ends of the laminate 200. The order of laminating the first resin films 11, the first metal layers 12, the second resin films 21, and the second metal layers 22 in the laminate 200 is the same as that in the laminate 100 shown in FIG. 1B.

A length $w_3$ of the first resin films 11 in the width direction (direction indicated by a double-headed arrow w in FIG. 2) is longer than a length $w_4$ of the second resin films 21 in the width direction. Thus, in the film capacitor 2, the first resin films 11 protrude more than the second resin film 21 by a length $d_3$ at the first end (where the external electrode 30a is formed), and the first resin films 11 also protrude more than the second resin films 21 by a length $d_4$ at the second end (where the external electrode 30b is formed). The second metal layers 22 on the surfaces of the second resin films 21 are not in contact with either the external electrode 30a or 30b.

The first metal layer 12 on the surface of the first resin film 11 is divided into a first metal layer 12a connected to the external electrode 30a and a first metal layer 12b connected to the external electrode 30b. There is a region (indicated by a double-headed arrow d in FIG. 2) without the metal layer 12 between the first metal layer 12a and the first metal layer 12b, and the first metal layer 12a and the first metal layer 12b are not electrically connected to each other.

Also in the film capacitor 2 shown in FIG. 2, the first resin films 11 have a Young's modulus at 150° C. of 0.6 GPa or more in a direction (indicated by the double-headed arrow w in FIG. 2) perpendicular to the lamination direction of the laminate 200 and parallel to a direction from the first end to the second end of the laminate 200 where the external electrodes 30 are formed.

In the film capacitor of the present invention, preferably, the first resin film satisfies the following formula:

$$Y \leq 0.5t + 0.5$$

where Y [mm] is the protruding length and t [μm] is the thickness of the first resin film.

When the above formula is satisfied, the temperature cycle characteristics are particularly good.

The following describes the external electrodes defining the film capacitor of the present invention.

The external electrodes are provided at the ends of the laminate of the first resin film and second resin film. One of the external electrodes is connected to the first metal layer or the second metal layer.

Any material may be used to form the external electrodes as long as it has conductivity and can be thermally sprayed. Examples thereof include zinc, tin, silver, nickel, copper, and alloys of two or more of these. A metal material including zinc is preferred.

The metal material including zinc has a relatively low melting point, so that the bondability between the first metal layer or the second metal layer and the external electrode can be easily increased.

In the film capacitor of the present invention, if necessary, the external electrodes may further include terminal conductors or leads connected thereto or may be enclosed in sealing resin or the like.

The film capacitor of the present invention is applicable to known applications. Since the film capacitor can extend the life of a device used in a high-temperature environment with large temperature fluctuations, the film capacitor is suitably used in power electronics devices to be mounted on automobiles and industrial machines, such as electric compressors/pumps, chargers, DC-DC converters, and drive inverters.

Method of Producing Film Capacitor

The following describes a method of producing the film capacitor of the present invention.

The method of producing the film capacitor of the present invention may be one including, for example: forming a first metal layer on a first resin film; forming a second metal layer on a second resin film; obtaining a laminate by laminating the first resin film and the second resin film; and forming external electrodes on opposed ends of the laminate.

In the obtaining a laminate, the first resin film and the second resin film are arranged such that the first resin film protrudes more than the second resin film at the first and/or second end of the laminate, whereby the film capacitor of the present invention is obtained.

The first resin film can be obtained by a known method of obtaining a film-like resin. For example, a resin or its precursor as a raw material is dispersed in a solvent to obtain a resin solution; the resin solution is applied to a substrate; and the resin solution is dried, cured, or the like, as needed.

The first metal layer is provided on the first resin film by a method such as vapor deposition.

The second resin film and the second metal layer can be obtained by the same methods as in the first resin film and the first metal layer.

The resulting laminate is described with reference to FIG. 3.

Figure 3:
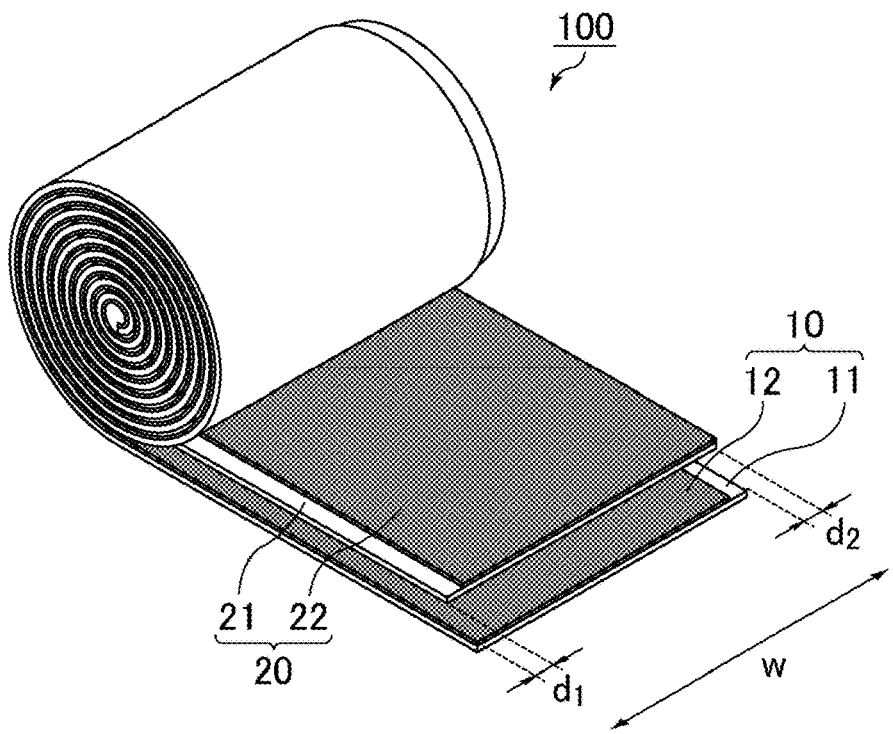
FIG. 3 is a schematic perspective view of an example of a laminate before external electrodes are formed.

FIG. 3 is a schematic perspective view of an example of the laminate before external electrodes are formed.

The laminate 100 shown in FIG. 3 is obtained by superimposing the first resin film 11 including the first metal layer 12 on the surface thereof and the second resin film 21 including the second metal layer 22 on the surface thereof, and winding these resin films. Thus, the laminate 100 is also referred to as a wound body. The first resin film 11 and the second resin film 21 shown in FIG. 3 have the same width (the length indicated by a double-headed arrow w in FIG. 3), and the first resin film 11 and the second resin film 21 are superimposed while they are displaced from each other. Thus, the first resin film 11 protrudes more than the second resin film 21 at a first end, and the second resin film 21 protrudes more than the first resin film 11 at a second end.

The positional relationship between the first resin film 11 and the second resin film 21 is still maintained after the laminate 100 is produced. Thus, when the laminate 100 is sandwiched in a direction perpendicular to the width direction and pressed into an oval cylindrical shape, and then the external electrodes are formed at both opposed ends by thermal spraying, the film capacitor 1 shown in FIG. 1A and FIG. 1B is obtained. The shape of the laminate 100 is not limited to the oval cylindrical shape and may be an oblong cylindrical shape.

The laminate may also be produced by another method, other than the method described above, which includes winding a first metalized film and a second metalized film in a superposed state around a surface of a circular core (core wheel) having a diameter that is several times greater than the thickness of the intended laminate to provide a cylindrical laminate having a hollow core, and cutting the laminate in a circumferential direction of the cylindrical shape.

The resulting laminate may be pressed or the like, if necessary, to adjust the shape.

Subsequently, an external electrode is formed at each end of the resulting laminate.

The external electrode is formed at each end of the laminate by thermal spraying, for example.

The temperature at each end of the wound body during formation of the external electrodes by thermal spraying is not limited, but is preferably 130° C. or higher, more preferably 150° C. or higher.

When the temperature at the end of the wound body is lower than 130° C., the bonding between thermally sprayed metals may be insufficient, resulting in poor connectivity of the external electrode. When the temperature at the end of the wound body is 150° C. or higher, metal diffusion between the vapor deposited electrode (metal layer) and the thermal spray material is facilitated to strengthen the bonding, providing good temperature cycle characteristics.

The temperature at each end of the laminate during formation of the external electrode can be controlled by adjusting the distance between a thermal spraying nozzle and the end of the laminate.

Any material (thermal spray material) may be used for thermal spraying as long as it has conductivity and can be thermally sprayed. Examples thereof include zinc, tin, silver, nickel, copper, and alloys of two or more of these.

The air pressure during thermal spraying (the pressure of the air to be sprayed from a thermal spraying system during thermal spraying) is not limited, but is preferably 0.3 MPa to 0.6 MPa.

The gas pressure supplied to the thermal spraying system is not limited as long as the air pressure can be adjusted to the above range.

Further, if necessary, the external electrodes formed by thermal spraying may be surface-treated by plating or the like, may include terminal conductors or leads connected thereto, or may be enclosed in sealing resin or the like.

EXAMPLES

Examples that more specifically disclose the film capacitor of the present invention are described below. The present invention is not limited to these examples.

Production of Resin Film

A polyvinyl acetoacetal (PVAA) resin powder was dissolved in a solvent mixture of toluene and methyl ethyl ketone to prepare a PVAA resin solution, and a tolylene diisocyanate (TDI)-trimethylolpropane (TMP) adduct prepolymer dissolved in ethyl acetate was added to the PVAA resin solution. Thus, resin mixtures 1 to 3 were obtained. Here, the solids concentration and the amount of each solution were adjusted such that the mixing ratio (weight ratio) of PVAA to TDI prepolymer was 4:6 (resin mixture 1), 6:4 (resin mixture 2), and 8:2 (resin mixture 3).

The resulting resin mixtures 1 to 3 were separately applied to polyethylene terephthalate (PET) substrates using a coater, dried, and cured by heat treatment at a temperature of 180° C. for one hour. Thus, resin films each having a thickness of 3 μm were produced.

Production of Metal Layer

Aluminum was vapor-deposited to a thickness of 20 nm onto the surface of each resin film to form a metal layer, and the resulting products were removed from the PET substrates. Thus, metallized films each including the metal layer on the resin film were obtained.

Measurement of Young's Modulus

Each metallized film was cut to dimensions of 10 mm (width)×5 mm (length), and the Young's modulus at 150° C. in the width direction was measured by the DMA method using RSA III available from TA Instruments. Table 1 shows the results.

Production of Wound Body

Each metallized film was cut into strips to prepare two metallized films having the same width, and these films were superimposed while they were displaced from each other by a predetermined length in the width direction. Then, these films were wound up into a cylindrical wound body by a winding machine. Subsequently, the resulting cylindrical wound body was pressed from two sides in a direction different from the width direction. Thus, a wound body having an oval cylindrical shape (also simply referred to as a wound body) was produced. Adjustment was made such that the direction from a first end to a second end of the resulting wound body was the same as the width direction of the metallized film at the time of measurement of the Young's modulus.

Here, the metallized film arranged to protrude outwardly more at the first end is referred to as a first resin film including a first metal layer, and the metallized film arranged to protrude outwardly more at the second end is referred to as a second resin film including a second metal layer. The first resin film and the second resin film have the same composition, and the first metal layer and the second metal layer have the same composition.

Production of External Electrodes

An external electrode was formed at one end of the wound body by metal spraying. A metal to be thermal sprayed was zinc (Zn), and the air pressure during thermal spraying was 0.4 MPa. The distance between the thermal spraying nozzle and the end of the wound body was adjusted to adjust the temperature at each end of the wound body. The temperature at each end of the wound body was measured by a thermocouple attached to the end of the wound body.

Another external electrode was formed at the other end in the same manner. Subsequently, conductor terminals were connected to the external electrodes, and the external electrodes were enclosed in resin. Thus, a film capacitor was produced.

Confirmation of Protruding Length

The following method was used to confirm that the protruding length of the first resin film of the resulting film capacitor correspond to the amount of displacement between the resin films (metallized films) in the production of the wound body.

First, the resulting film capacitor was cut in a direction parallel to the width direction (perpendicular to the lamination direction of the laminate and parallel to a direction from the first end to the second end of the laminate where the external electrodes were formed) and parallel to the pressing direction of the wound body, thus obtaining a cut surface on which the first metalized films and the second metalized films in the laminated state were exposed. Subsequently, the cut surface was polished to confirm the position of the ends of the first resin films and the position of the ends of the second resin films at the ends of the laminate, and the protruding length of each first resin film was measured. The measurement was performed as follows. The wound body in the cross section was trisected in the thickness direction, and any one of the first resin films was selected from each section. The ends of two second resin films adjacent to the selected first resin film were imaginarily extended to the first resin film to obtain an end of an imaginary second resin film, and a mid-point of the end was regarded as a reference point, and the distance from the reference point to the end of the first resin film was measured. When the first resin film was curved, curve approximation was used. When the first resin film was not curved, the distance was measured as a straight distance (distance between two points). As a result, all the first resin films had the same protruding length, and the protruding length corresponded to the amount of displacement between the metallized films before the wound body was produced.

As described above, the protruding length of each first resin film indicates how much the first resin film protrudes from the end of the second resin film, i.e., the protruding length of the first resin film from the end of the second resin film when the first resin film is not deformed, and the protruding length remains the same even when the first resin film is tilted or bent during formation of the external electrode.

Example 1

Film capacitors (sample numbers 1 to 17) were produced by changing the mixing ratio (weight ratio) of PVAA to TDI prepolymer (PVAA:TDI), the amount of displacement between the metallized films, and the temperature at each end of the wound body as shown in Table 1. The temperature cycle characteristics of the film capacitors were measured by the following method. Table 1 shows the results.

Measurement of Temperature Cycle Characteristics

The resulting film capacitor was subjected to a temperature cycle test (also simply referred to as a "test") in which a temperature cycle of a lowest temperature of −40° C. with a retention time of 30 minutes and a highest temperature of 150° C. with a retention time of 30 minutes was repeated 1000 times in an air tank. The ratio of an equivalent series resistance (hereinafter, ESR) value after the test to an ESR value before the test was determined, and the temperature cycle characteristics were evaluated based on the following criteria.

Excellent: The ESR after the test is not more than 1.2 times the ESR before the test.

Good: The ESR after the test is more than 1.2 times and not more than 1.5 times the ESR before the test.

Fair: The ESR after the test is more than 1.5 times and not more than 2 times the ESR before the test.

Poor: The ESR after the test is more than 2 times the ESR before the test.

TABLE 1

| Sample No. | Composition of resin film [PVAA:TDI] | Young's modulus at 150° C. [GPa] | Temperature at ends of wound body [° C.] | Protruding length [mm] | Temperature cycle characteristics |
|---|---|---|---|---|---|
| 1 | 4:6 | 0.98 | 130 | 1 | Fair |
| 2 | 4:6 | 0.98 | 140 | 1 | Fair |
| 3 | 4:6 | 0.98 | 150 | 0.2 | Poor |
| 4 | 4:6 | 0.98 | 150 | 0.5 | Good |
| 5 | 4:6 | 0.98 | 150 | 1 | Good |
| 6 | 4:6 | 0.98 | 150 | 2 | Good |
| 7 | 4:6 | 0.98 | 150 | 3 | Good |
| 8 | 4:6 | 0.98 | 150 | 4 | Poor |
| 9 | 6:4 | 0.6 | 150 | 0.2 | Poor |
| 10 | 6:4 | 0.6 | 150 | 0.5 | Good |
| 11 | 6:4 | 0.6 | 150 | 1 | Good |
| 12 | 6:4 | 0.6 | 150 | 2 | Good |
| 13 | 6:4 | 0.6 | 150 | 3 | Good |
| 14 | 6:4 | 0.6 | 150 | 4 | Poor |
| 15 | 8:2 | 0.45 | 150 | 1 | Poor |
| 16 | 8:2 | 0.45 | 150 | 2 | Poor |
| 17 | 8:2 | 0.45 | 150 | 3 | Poor |

As shown in Table 1, the samples in which the amount of displacement between the resin films (protruding length of the first resin film) was 0.5 mm to 3 mm showed good temperature cycle characteristics. Those in which the amount of displacement between the resin films (protruding length of the first resin film) was less than 0.5 mm or more than 3 mm (sample numbers 3, 8, 9, and 14) showed poor temperature cycle characteristics.

The samples in which the resin films had a Young's modulus at 150° C. of less than 0.6 GPa in the width direction (sample numbers 15 to 17) showed poor temperature cycle characteristics regardless of the protruding length of the first resin film.

This confirms that the temperature cycle characteristics were good in the film capacitors in which the amount of displacement between the resin films (protruding length of the first resin film) was 0.5 mm to 3 mm and the resin films had a Young's modulus at 150° C. of 0.6 GPa or more in the width direction.

Example 2

Film capacitors (sample numbers 18 to 25) were produced by changing the mixing ratio of PVAA to TDI prepolymer and the thickness of the resin films, and the temperature cycle characteristics were measured by the same method as in Example 1. Table 2 shows the results.

TABLE 2

| Sample No. | Composition of resin film [PVAA:TDI] | Young's modulus at 150° C. [GPa] | Film Thickness [µm] | Protruding length [mm] | Temperature cycle characteristics |
|---|---|---|---|---|---|
| 18 | 6:4 | 0.6 | 0.8 | 3 | Fair |
| 19 | 6:4 | 0.6 | 1 | 3 | Good |
| 20 | 6:4 | 0.6 | 1.2 | 3 | Good |
| 21 | 6:4 | 0.6 | 3 | 3 | Good |
| 22 | 4:6 | 0.98 | 0.8 | 3 | Fair |
| 23 | 4:6 | 0.98 | 1 | 3 | Good |
| 24 | 4:6 | 0.98 | 1.2 | 3 | Good |
| 25 | 4:6 | 0.98 | 3 | 3 | Good |

The results in Table 2 show that the use of the resin films having a thickness of 1 µm or more (sample numbers 19 to 21 and 23 to 25) results in even better temperature cycle characteristics.

Example 3

Film capacitors (sample numbers 26 to 48) were produced by changing the amount of displacement between the metallized films and the thickness of the metallized films as shown in Table 3 while the mixing ratio (weight ratio) of PVAA to TDI prepolymer was fixed to 6:4 and the temperature at each end of the wound body was fixed to 150° C. The temperature cycle characteristics were measured by the same method as in Example 1. Table 3 shows the results.

The symbol "-" in Table 3 means that the film capacitor was not produced and the temperature cycle characteristics were not measured.

TABLE 3

| Protuding length [mm] | Film thickness [um] | | | | | |
|---|---|---|---|---|---|---|
| | 0.8 | 1 | 2 | 3 | 4 | 5 |
| 0.5 | Excellent | Excellent | — | — | — | — |
| 1 | Good | Excellent | Excellent | — | — | — |
| 1.5 | Good | Good | Excellent | — | — | — |
| 2 | Good | Good | Good | Excellent | — | — |
| 2.5 | Good | Good | Good | Good | Excellent | — |
| 3 | Fair | Good | Good | Good | Good | Excellent |

The results in Table 3 show that the temperature cycle characteristics were particularly good (evaluated as excellent) in the film capacitors in which the following formula was satisfied:

$$Y \leq 0.5t + 0.5$$

where Y [mm] was the protruding length and t [μm] was the film thickness.

In Table 3, the symbol "-" in Table 3 means that the film capacitor was not produced and the temperature cycle characteristics were not measured. Yet, the cases indicated by "-" correspond to the conditions that result in excellent temperature cycle characteristics, i.e., the cases where the thickness of the resin films was increased while the protruding length was unchanged. In such conditions, the thermally sprayed metal more easily penetrate correspondingly to the increase in film thickness. Thus, presumably, the cases indicated by "-" would result in good bondability between the thermally sprayed metal and would inevitably result in excellent temperature cycle characteristics.

Example 4

Film capacitors (sample numbers 49 to 60) each having a protruding length of 3 mm were produced by using a 3-μm thick resin film in the same manner as in Example 1, except that resin mixtures were prepared by mixing various resins according to the combinations shown in Table 4. The Young's modulus at 150° C. in the width direction and the temperature cycle characteristics were measured. Table 4 shows the results.

For the combinations of "phenoxy" and "methylene diisocyanate (MDI)" (sample numbers 49 to 51), phenoxy resin (high molecular weight bisphenol A epoxy resins having an epoxy group at each end of the molecular chain) was dissolved in a mixed solution of toluene and methyl ethyl ketone to prepare a phenoxy resin solution, and MDI dissolved in ethyl acetate was added to the phenoxy resin solution to prepare a resin mixture.

For the combinations of "triacetyl cellulose (TAC)" and "xylylene diisocyanate (XDI)" (sample numbers 52 to 54), TAC was dissolved in a mixed solution of toluene and methyl ethyl ketone to prepare a TAC solution, and XDI dissolved in ethyl acetate was added to the TAC solution to prepare a resin mixture.

For the combinations of "phenoxy" and "epoxy" (sample numbers 55 to 57), phenoxy resin (high molecular weight bisphenol A epoxy resins having an epoxy group at each end of the molecular chain) was dissolved in a mixed solution of toluene and methyl ethyl ketone to prepare a phenoxy resin solution, and epoxy resin (novolac epoxy resin) dissolved in methyl ethyl ketone was added to the phenoxy resin solution. Then, 0.1 wt % of imidazole as a catalyst for thermosetting reaction was added to the mixture. Thus, a resin mixture was prepared.

For the combinations of "phenoxy" and "melamine" (sample numbers 58 to 60), phenoxy resin (high molecular weight bisphenol A epoxy resins having an epoxy group at each end of the molecular chain) was dissolved in methyl ethyl ketone, and melamine resin dissolved in ethyl acetate (alkylated melamine resin) was added thereto to prepare a resin mixture.

TABLE 4

| Sample No. | First organic material | Second organic material | Solids weight ratio [%] | | Young's modulus at 150° C. [GPa] | Protuding length [mm] | Temperature cycle characteristics |
| | | | First organic material | Second organic material | | | |
|---|---|---|---|---|---|---|---|
| 49 | Phenoxy | MDI | 80 | 20 | 0.5 | 3 | Poor |
| 50 | | | 60 | 40 | 0.9 | 3 | Good |
| 51 | | | 40 | 60 | 1.1 | 3 | Good |
| 52 | TAC | XDI | 80 | 20 | 0.3 | 3 | Poor |
| 53 | | | 60 | 40 | 0.6 | 3 | Good |
| 54 | | | 40 | 60 | 0.8 | 3 | Good |
| 55 | Phenoxy | Epoxy | 80 | 20 | 0.4 | 3 | Poor |
| 56 | | | 60 | 40 | 0.7 | 3 | Good |
| 57 | | | 40 | 60 | 0.8 | 3 | Good |
| 58 | Phenoxy | Melamine | 80 | 20 | 0.2 | 3 | Poor |

TABLE 4-continued

| Sample No. | First organic material | Second organic material | Solids weight ratio [%] First organic material | Solids weight ratio [%] Second organic material | Young's modulus at 150° C. [GPa] | Protruding length [mm] | Temperature cycle characteristics |
|---|---|---|---|---|---|---|---|
| 59 | | | 60 | 40 | 0.7 | 3 | Good |
| 60 | | | 40 | 60 | 0.8 | 3 | Good |

The results in Table 4 show that the temperature cycle characteristics were good, regardless of the materials of the resin film, when the Young's modulus at 150° C. was 0.6 GPa or more (sample numbers 50, 51, 53, 54, 56, 57, 59, and 60) and the protruding length was 3 mm.

REFERENCE SIGNS LIST 1, 2 film capacitor
10 first metalized film
11 first resin film
11a first surface of first resin film
11b second surface of first resin film
12, 12a, 12b first metal layer
20 second metalized film
21 second resin film
21a first surface of second resin film
21b second surface of second resin film
22 second metal layer
30, 30a, 30b external electrode
100, 200 laminate
11', 21' resin film
12', 22' metal layer
13' gap
100' laminate

The invention claimed is:

1. A film capacitor comprising:
a laminate having a first resin film including a first metal layer on a surface thereof alternately laminated with a second resin film including a second metal layer on a surface thereof, the laminate having opposed first and second ends;
a first external electrode on the first end of the laminate; and
a second external electrode on the second end of the laminate,
wherein the first resin film protrudes more than the second resin film by a first protruding length of 0.5 mm to 3 mm on the first end of the laminate, and
the first resin film has a Young's modulus at 150° C. of 0.6 GPa or more in a direction perpendicular to a lamination direction of the laminate and parallel to a direction from the first end to the second end of the laminate.

2. The film capacitor according to claim 1, wherein the first resin film satisfies:
$Y \leq 0.5t+0.5$, where Y is the first protruding length and t is a thickness of the first resin film.

3. The film capacitor according to claim 1, wherein the first resin film has a thickness of 1 μm or more.

4. The film capacitor according to claim 1, wherein the first resin film has a thickness of 3 μm or less.

5. The film capacitor according to claim 1, wherein the first resin film has a thickness of 1 μm to 5 μm.

6. The film capacitor according to claim 1, wherein the first resin film has a thickness of 1 μm to 3 μm.

7. The film capacitor according to claim 1, wherein the Young's modulus at 150° C. of the first resin film is 0.6 GPa to 1.1 GPa.

8. The film capacitor according to claim 1, wherein the first resin film contains, as a main component thereof, a resin having at least one of a urethane bond or a urea bond.

9. The film capacitor according to claim 8, wherein the main component is a curable resin.

10. The film capacitor according to claim 1, wherein the first resin film contains, as a main component thereof, a resin having both a urethane bond and a urea bond.

11. The film capacitor according to claim 1, wherein the first and second external electrodes are made of a metal material that includes zinc.

12. The film capacitor according to claim 1, wherein the first metal layer is thinner than the first resin film.

13. The film capacitor according to claim 12, wherein the first metal layer has a thickness of 1 nm to 100 nm.

14. The film capacitor according to claim 1, wherein the second resin film protrudes more than the first resin film by a second protruding length of 0.5 mm to 3 mm on the second end of the laminate, and
the second resin film has a Young's modulus at 150° C. of 0.6 GPa or more in a direction perpendicular to the lamination direction of the laminate and parallel to the direction from the first end to the second end of the laminate.

15. The film capacitor according to claim 14, wherein the first protruding length is equal to the second protruding length.

16. The film capacitor according to claim 1, wherein the first resin film protrudes more than the second resin film by a second protruding length of 0.5 mm to 3 mm on the second end of the laminate,
a first length of the first resin film is greater than a second length of the second resin film in the direction from the first end to the second end of the laminate,
the first metal layer is divided into a first portion connected to the first external electrode and a second portion connected to the second external electrode, and the first portion and the second portion are not electrically connected to each other.

17. The film capacitor according to claim 1, wherein the first metal layer contains aluminum or zinc.

18. The film capacitor according to claim 1, wherein the first resin film contains at least one of an isocyanate group or a hydroxyl group.

19. The film capacitor according to claim 1, wherein, when the film capacitor is subjected to a temperature cycle test in which a temperature cycle of a lowest temperature of −40° C. with a retention time of 30 minutes and a highest temperature of 150° C. with a retention time of 30 minutes is repeated 1000 times in an air tank, an ESR value after the temperature cycle test is not more than 1.5 times an ESR value before the temperature cycle test.

20. The film capacitor according to claim 1, wherein, when the film capacitor is subjected to a temperature cycle test in which a temperature cycle of a lowest temperature of −40° C. with a retention time of 30 minutes and a highest temperature of 150° C. with a retention time of 30 minutes is repeated 1000 times in an air tank, an ESR value after the temperature cycle test is not more than 1.2 times an ESR value before the temperature cycle test.

* * * * *